United States Patent [19]

Everson

[11] 4,239,438
[45] Dec. 16, 1980

[54] DEVICE FOR LIFTING AND CARRYING LOADS ON TOP OF PICKUP TRUCKS

[76] Inventor: Clifford R. Everson, 1408 - 16th Ave., Camanche, Iowa 52730

[21] Appl. No.: 966,379

[22] Filed: Dec. 4, 1978

[51] Int. Cl.³ .............................................. B60P 9/00
[52] U.S. Cl. .................................. 414/462; 224/310;
414/559; 414/538; 414/569; 414/728; 414/742
[58] Field of Search ............. 414/559, 538, 569, 462,
414/463, 464, 465, 678, 728, 742, 680, 598;
224/310

[56] References Cited
U.S. PATENT DOCUMENTS

| 3,843,002 | 10/1974 | Pihlgren | 414/538 X |
| 3,915,323 | 10/1975 | Underhill | 414/462 |
| 3,972,433 | 8/1976 | Reed | 414/462 |

Primary Examiner—Frank E. Werner
Attorney, Agent, or Firm—Glenn H. Antrim

[57] ABSTRACT

A device includes a fixed frame over the bed and the cab of a pickup truck, a pair of slanting rails along the sides of the fixed frame, and a folding frame that is detachably connected to the rear portion of the fixed frame. Unfolding the folding frame extends a carrying frame slantingly, rearwardly from the rails to the rear of the folding frame. Folding the frame by operation of a winch moves the front end of the carrying frame up the rails while the rear end of the carrying frame is guided by members of the folding frame to a position over the bed of the pickup truck. After removing locking pins, the winch is again operated to position the folding frame over the fixed frame at the sides of the carrying frame.

4 Claims, 6 Drawing Figures

DEVICE FOR LIFTING AND CARRYING LOADS ON TOP OF PICKUP TRUCKS

BACKGROUND OF THE INVENTION

This invention relates to loading and carrying devices for securing loads on top of vehicles, and more particularly, to devices that support loads above cabs and beds of pickup trucks.

Various combinations of rails, sliding members, and pivotal members have been used with winches as loaders to lift and position pleasure craft or vehicles; particularly, many different loading devices have been designed for handling small boats used for fishing. Often a pickup truck is used to carry a boat while it is towing a recreational trailer. Loading devices that are most desirable for this purpose permit easy loading of boats over beds and cabs of pickup trucks, have carrying frames that can extend slantingly into water at shorelines for easy loading and unloading, require little effort to prepare the loading device for transportation, do not interfere with the hitching of recreational trailers, and permit normal use of the beds of the pickup trucks without having to disassemble or to remove the loading devices. Prior loading devices for pickup trucks have not been developed to the extent required to have all these desirable features.

SUMMARY OF THE INVENTION

According to the present invention, a loading and carrying device for transporting a boat above the bed and the cab of a pickup truck comprises a fixed frame attached to stake-holders of the pickup truck, a pair of rails attached to the fixed frame, a folding frame operated by a winch for loading the boat from a shoreline to a position over the bed and the cab of the pickup truck, and a carrying frame on which a boat is loaded, the carrying frame being supported by the rails and the folding frame during loading and unloading. In preparation for loading or for unloading a boat, the folding frame is unfolded to extend the carrying frame from the rear end of the bed of the pickup slantingly to the rear end of the folding frame. The front end of the carrying frame is supported by the rails, and the rear end of the carrying frame is suspended from the rear end of the folding frame.

A cable of a winch is connected to the rear end of the folding frame and slants forwardly and upwardly to run over pulleys at the tops of upright members. The folding frame has guiding members that guide the boat upwardly and forwardly while the front end of the boat travels up the pair of rails that extends slantingly up the sides of the pickup truck and horizontally over at least a portion of the cab of the pickup truck.

The upright members with the pulleys are part of the folding frame, and during loading and unloading, are secured vertically to the fixed frame. The folding frame is attached to the fixed frame by a pair of guiding and locking plates such that when two pairs of pins are removed from the plates and the folding frame, the winch can be operated after the boat is loaded to pull the folding frame to a position for transportation over the fixed frame at the sides of the loaded boat.

BRIEF DESCRIPTION OF THE DRAWING

FIG. 1 shows a boat on the loader in two different positions during loading or unloading;

FIG. 2 shows the boat substantially in an upper position to be transported and a rear folding frame in two different positions before being moved into a final position to be transported; and FIG. 3 is an unobstructed view of the members of the loader.

in FIG. 4, the folding frame has been folded after use but is still in a vertical position with respect to the locking plate and the fixed frame;

in FIG. 5, the folding frame is shown in a slanting position as it is being raised and rotated with respect to the locking plate and the fixed frame; and in FIG. 6, the folding frame has been rotated to a position over the fixed frame and brought forward in a normal position for transportation.

DESCRIPTION OF THE PREFERRED EMBODIMENT

Figure 1:
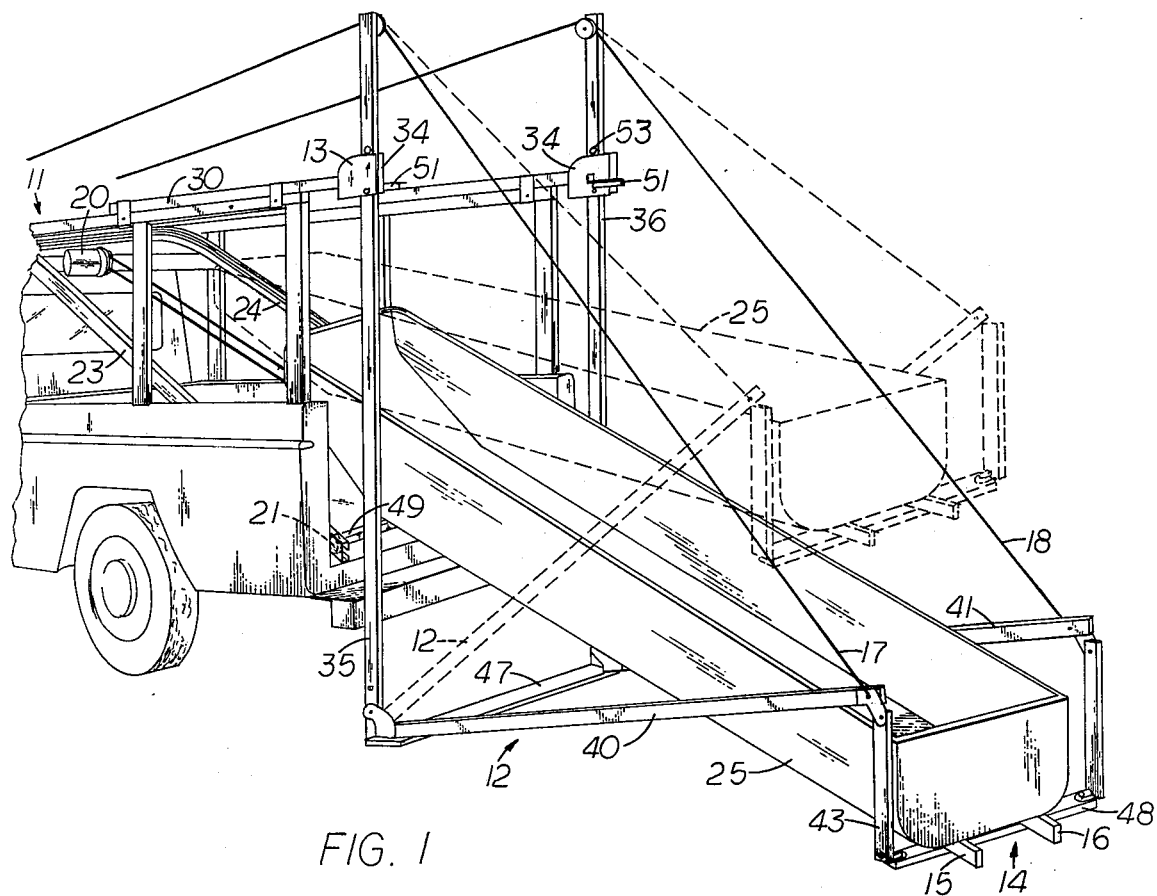
FIGS. 1-3 are in general rear perspective views of the loader of this invention installed on a pickup truck.
Figure 2:
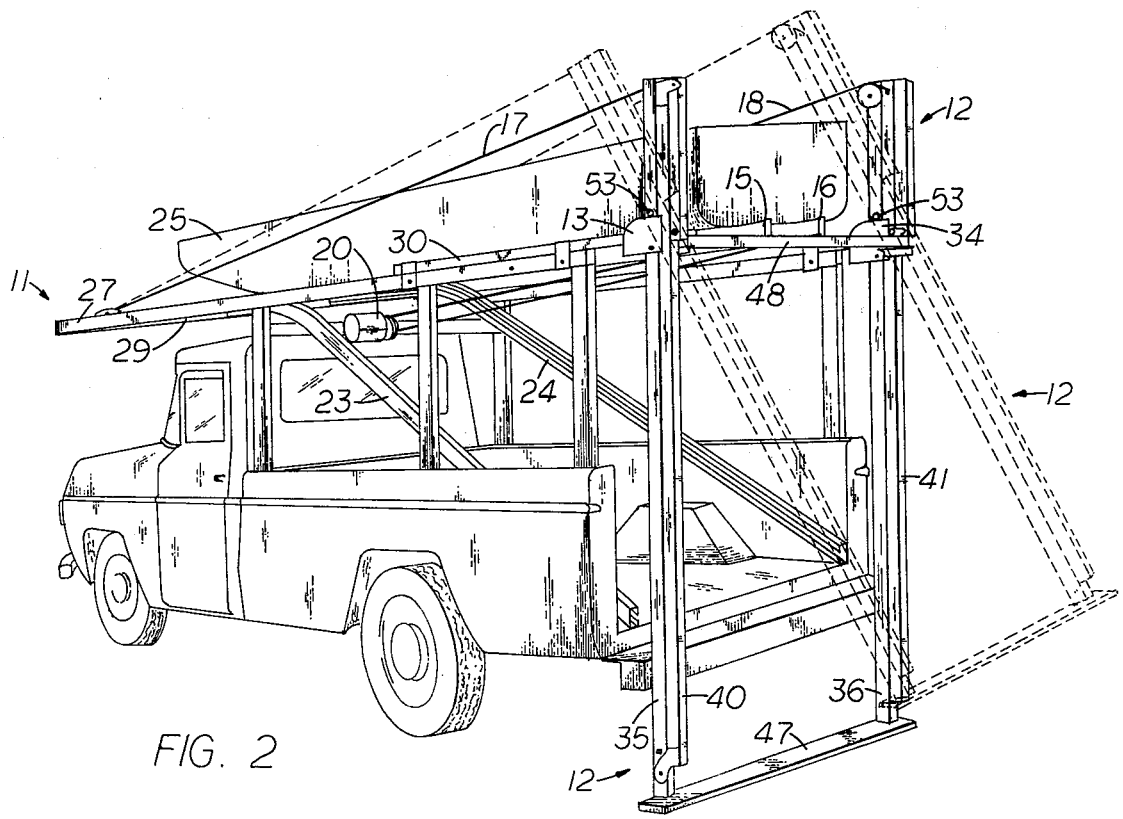
Figure 3:
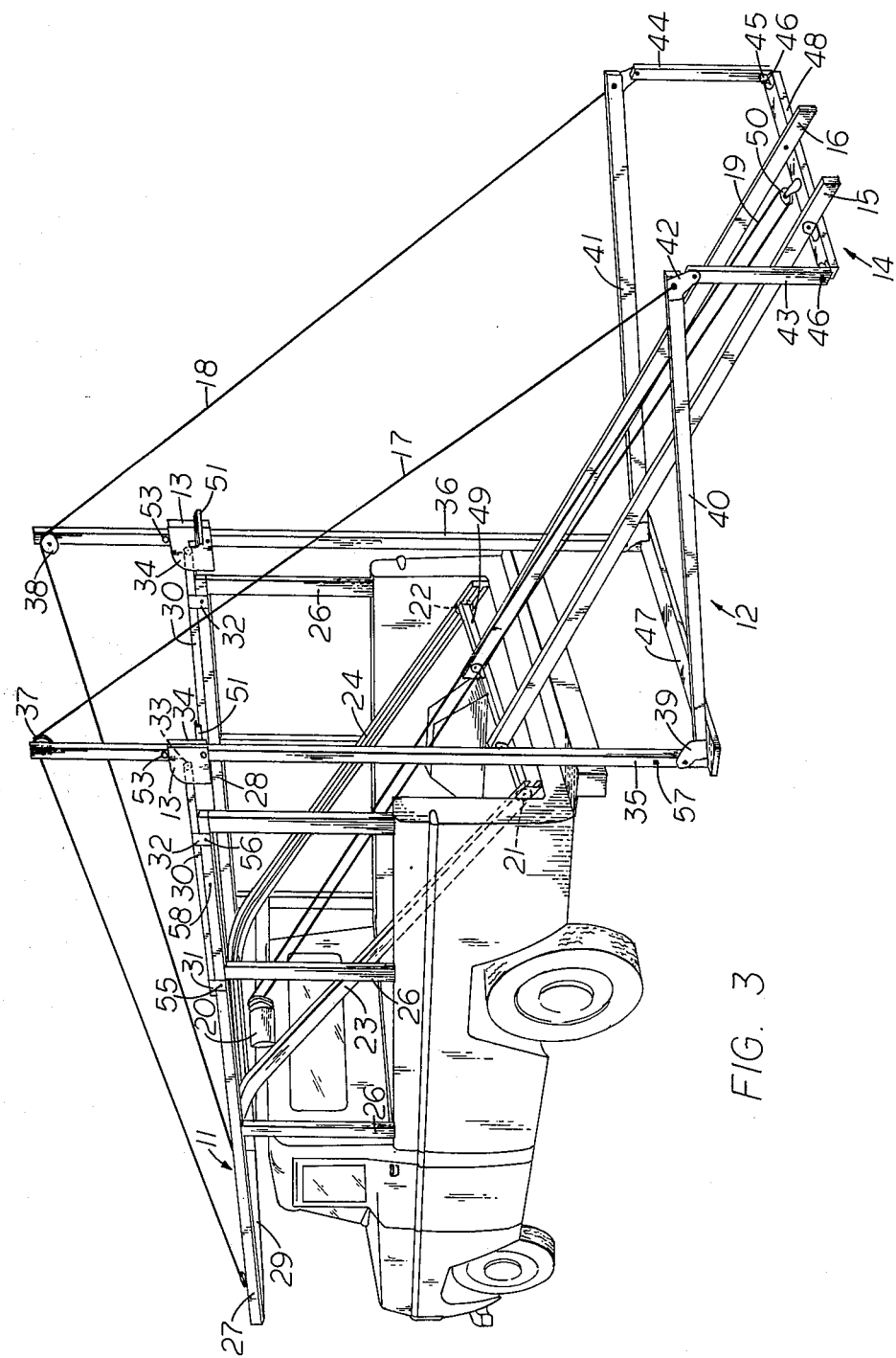

With reference to FIGS. 1-3, a fixed frame 11 is connected to the sides of the bed of a pickup truck such that upper members of the fixed frame 11 extend over the sides and forwardly over a cab of the pickup truck. A folding frame 12 is connected to the fixed frame 11 by pivotal and locking means including a pair of guiding and locking plates 13 and 34 at each upper, rear corner of the fixed frame. A carrying frame 14 has spaced longitudinal members 15 and 16; the rear end of the carrying frame is connected to the folding frame 12. Cables 17 and 18 are connected to respective sides of the folding frame 12. These cables are connected to a cable 19, and the cable 19 is connected to a carrying frame 14 and a winch 20. The winch 20 is located behind the upper portion of a cab of the pickup truck to which the fixed frame 11 is attached. The front end of the carrying frame 14 is supported by a pair of rollers 21 and 22 that are contained in respective rails 23 and 24. The rails 23 and 24 are connected to respective sides of the fixed frame 11 and extend slantingly forwardly and upwardly from the rear portion of the bed of the pickup truck and then horizontally over the cab of the pickup truck.

When the folding frame 12 has been unfolded as shown in FIGS. 1 and 3, a boat 25 can readily be placed on the carrying members 15 and 16. The carrying members extend rearwardly from the rear of the bed of the pickup truck to a position near the ground which may be under water at a shore. After the boat 25 is placed on the carrying frame 14, the winch 20 can be operated such that the folding frame 12 guides the rear end of the boat upwardly and forwardly while the front end follows the rails 23 and 24 through intermediate positions as shown in the dashed view of FIG. 1 until the boat 25 is loaded in the position over the cab and the bed of the pickup truck as shown in FIG. 2. After the boat 25 is in the upper position, two pairs of pins are removed as described below to permit the folding frame 12 to be rotated about the guiding and locking plates 13 for rotating the folding frame 12 as shown in the dashed lines of FIG. 2 to a position where the folding frame 12 lies over the fixed frame 11 along the sides of the boat 25.

In more detail with particular reference to FIG. 3, the fixed frame 11 has a plurality of standards 26 along each side to fit in usual stake-holders of the box of a pickup truck to which the frame is to be attached. Fixed horizontal members 27 and 28 along respective sides extend rearwardly from opposite positions in front of the cab of the pickup truck at a level higher than the roof of the cab to points about even with the rear end of the bed of the pickup truck. The standards 26 and the fixed members 27 and 28 may be fabricated from 2-inch (5.1-cm) square steel tubing and welded together in the usual manner, the fixed horizontal members 27 and 28 being welded on top of the respective standards 26. A cross member 29 is fastened between the front ends of the two fixed horizontal members 27, and it not only provides rigidity but also a place to which pulleys are fastened to guide the hoisting cable.

The rails 23 and 24 may be usual garage-door rails, and are fastened to respective sides of the fixed frame 11. A slanting portion of each of the rails 23 and 24 extends upwardly and forwardly from the rear end of the bed of the pickup truck, and the rails are curved horizontally at points somewhat above and behind the cab of the pickup to extend forwardly along the inside edges of respective fixed horizontal members. The forward ends of the rails extend at least a substantial distance over the cab as required for movement of a respective roller 21 or 22 as the carrying frame 14 approaches a forward position in which a load is held while being transported.

A sliding member 30 is positioned over the rear portion of each of the fixed horizontal members 27 and 28. Each of the sliding members 30 are attached by a pair of spaced brackets 31 and 32 that are fastened to the sliding member and fits as a sliding band about the respective fixed horizontal member 27 or 28. The brackets 31 and 32 are positioned along the respective sliding member 30 such that when the member is moved to its most rearward position, the lower portions of the brackets 31 and 32 come in contact with the respective standard 26 to function as a stop to limit the rearward motion. When the sliding members 30 are positioned rearwardly, their rear ends are about even with the rear surface of the bumper of the pickup truck, and when the sliding members 30 are positioned forwardly as described below, the rear ends of the sliding members 30 are about even with the rear ends of the fixed horizontal members 27 and 28 and the rear end of the bed of the pickup truck. As shown most clearly in FIGS. 4–6, a bracket and roller 33 are connected to the rear end of each of the sliding members 30 so that each roller is slightly beyond the end of the respective sliding member 30.

Guiding and locking plates 13 and 34 to guide the folding frame 12 while it is being rotated and moved to a position for being transported, are fastened, such as by welding, to opposite sides of respective sliding members 30. Each of the plates 13 and 34 has a rectangular portion that extends rearwardly from the respective sliding member 30 and a forward portion with an upper radial surface that curves forwardly and downwardly to a front edge along a side of a respective sliding member 30.

The different members of the folding frame 12 are most clearly shown in FIG. 3. The folding frame 12 is shown unfolded and the carrying frame 14 is in the most convenient position for receiving a load. In this loading or unloading position of the folding frame 12, upright members 35 and 36 are supported by the guiding and locking plates 13 and 34 attached to the rear ends of respective sliding members 30. The sliding members 30 are now in their most rearward position as determined by either or both of brackets 31 and 32 functioning as stops. The upright members 35 and 36 extend upwardly to a level above the top of the fixed frame 11 for supporting respective pulleys 37 and 38 and cables 17 and 18. The upright members 35 and 36 extend downwardly to a level below the bed and the bumper of the pickup truck to which the loader is attached. A pivotal plate 39 is pivotally connected to the lower end of each of the upright members 35 and 36.

Guiding members 40 and 41 are connected to the pivotal plates 39, a lower end of each member being connected to a respective plate. A pivotal plate 42 and the end of a respective cable 17 or 18 are connected to the upper end of each of the guiding members 40 and 41. The length of each of the guiding members 40 and 41 is about equal to the length of the upright members 35 and 36 such that when the guiding members are folded to an upright position, the points at which the cables 17 and 18 are connected to the ends of the respective guiding members are slightly below the uppermost portions of the grooves of the pulleys 37 and 38.

Suspending members 43 and 44 hang downwardly from the respective pivotal plates 42 connected to the guiding members 40 and 41. The lower end of each of the suspending members 43 and 44 is pivotally connected by a pin 46 to a U-shaped bracket 45 that is connected to a respective end of a rear cross member 48 of the carrying frame 14. Typically, the lengths of the different members of the folding frame 12 are: upright members 35 and 36, 8 feet (2.4 m); the guiding members 40 and 41, 6 ft. (1.8 m); and the suspending members 43 and 44, 2 ft. (0.6 m). When the members of the folding frame 12 have these dimensions, the length of each of the carrying members 15 and 16 is 10 feet (3 m). The front ends of the carrying members 15 and 16 rest on and are attached by brackets to a front cross member 49, and the ends of the cross members terminate in rollers 21 and 22 within the rails 23 and 24 respectively.

The arrangement of the hoisting cables connected to the winch 20 need not be shown in detail but can be understood with reference to FIG. 3. As described above, the ends of the lengths of cables 17 and 18 are connected to the outer ends of the guiding members 40 and 41 respectively. Cable 17 runs over the pulley 37 that is mounted to the inner surface at the top of the upright member 35 and then about a pulley (not shown) mounted near an outer end of the front cross member 29 and inwardly around a pulley near the center of the rear surface of the cross member 29. Likewise, the cable 18 runs over the pulley 38 mounted at the top of the upright member 36 and around a pulley near the opposite end of the cross member 29 and about a pulley near the center of the cross member 29. The two cables 17 and 18 are joined as cable 19, and cable 19 passes rearwardly over a shoe or guide (not shown) above a reel of the winch 20 and continues rearwardly around a pulley 50 that is connected to the center of the forward edge of the rear cross member 48 and then forwardly to the winch 20. As the winch 20 is operated to wind the cable, a forward force is applied to the center of the cross member 48 and an upward and forward force is applied to the ends of both of the guiding members 40 and 41.

Figure 4:
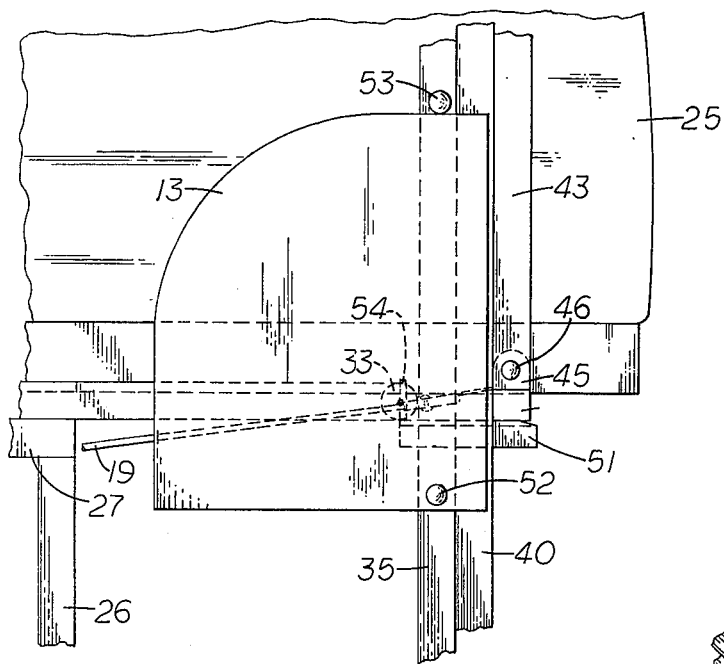
FIGS. 4-6 are side views of a pivotal and locking plate between a fixed frame attached to the pickup truck and the folding frame.
Figure 5:
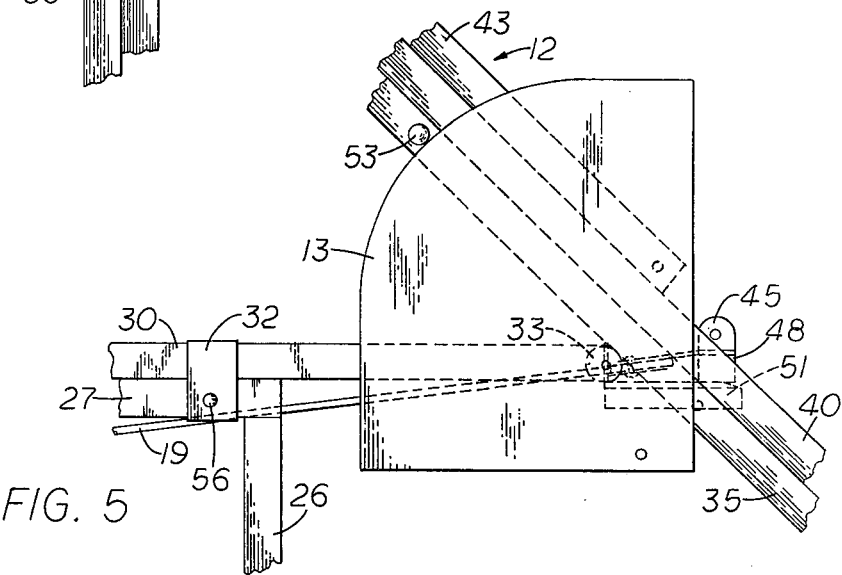
Figure 6:
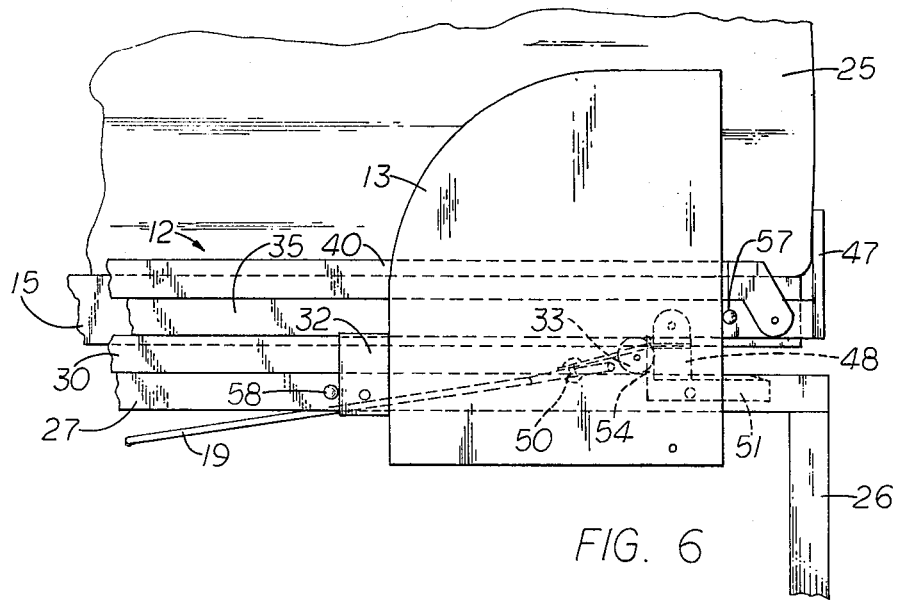

The pivotal plate 13 of FIGS. 4–5 will be described in detail with respect to the loading operation of the loading and carrying device. After a load such as a boat is placed on the carrying frame 14 as shown in FIG. 1, the winch 20 is operated to wind the cables 17-19 for pulling on the guiding members 40 and 41 and on the rear cross member 48 of the carrying frame 14. The guiding members 40 and 41 are rotated about their respective pivotal plates 39 to move the carrying frame 14 upwardly and forwardly as shown in the dashed lines of FIG. 1. While the carrying frame is being moved, the rollers 21 and 22 (FIG. 3) are moved up the slanting portions of the rails 23 and 24 respectively. With reference to FIG. 3, the guiding and locking plates 13 and 34 are welded on opposite sides of the rear end of a respective sliding member 30. With reference to FIGS. 4-6, a shelf 51 that extends inwardly and rearwardly from the plate 34 is welded or otherwise secured to the lower portion of the inner surface of the plate 34. When the carrying frame 14 approaches the upper position shown in FIG. 2, the ends of the cross member 48 of the carrying frame slide onto and rest on the respective shelves 51.

After the cross member 48 is positioned over the shelves 51, two pins from each side of the folding frame 14, pins 46 and 52 as shown in FIG. 4, are removed to permit movement of folding frame 12 to positions over the fixed frame 11 beside the load or boat 25. The pin 46 is the pin that secures the lower end of each of the suspending members 43 and 44 to a respective bracket connected to the rear cross member 48 of the carrying frame 14. The rear cross member 48 is now supported entirely on the shelves 51. While the pins 52 are in place, they extend inwardly through a respective guiding and locking plate 13, one of the upright members 35 and 36, and through an adjacent guiding and locking plate 34. After the pin 52 is removed, the upright members 35 and 36 are each supported by a respective lug or projecting bolt 53 that passes through the respective upright member 35 or 36 and projects over the adjacent guiding and locking plates 13 and 34.

When the winch 20 is started again, the folding frame 12 rotates according to the dashed lines of FIGS. 2 and 5. The guiding and locking plates 13 and 34 guide the respective folding members 35, 40 and 43 of FIG. 5 while the entire folding frame 12 pivots about the roller 33 that is rotatively connected to the end of the sliding member 30. While the folding frame 12 is being rotated, the lugs 53 move over a curved surface corresponding to that shown for the guiding and locking plate 13 of FIG. 5. As the winch 20 continues to be operated, the upright members 35 and 36 come in contact with the upper surfaces of the respective sliding members 30 such that the folding frame 12 is supported over the fixed frame 11. With particular reference to FIG. 6, as the winch continues to be operated, the rear cross member 48 of the carrying frame 14 is pulled forwardly against a stop 54 at the forward end of each of the shelves 51 and the cross member and stop 47 is pulled up against the ends of the carrying members 15 and 16 and function as a rearward stop for the boat 25.

While the sliding members are in their rearward position, pin 55 (FIG. 3) is in a position through a respective bracket 31 and the fixed member 27 or 28, and likewise a pin 56 is in position through a respective bracket and a sliding member to retain the sliding members 30 in the rearward position. The pins 55 and 56 are now removed to permit forward movement of the sliding members. In addition to the stop 54 for moving the sliding members 30 forward, projections or lugs 57 may project from the outer surfaces at the lower ends of the upright members 35 and 36. Another short operating period of the winch 20 causes the lugs 57 to come in contact with the respective guiding and locking plates 13 as the folding frame 12 is moved into the forward position shown in FIG. 6. A lug 58 (FIGS. 3 and 6) projects a short distance outwardly from the outer surface of each of the fixed horizontal members 27 and 28 to function as a stop to limit the forward movement of the sliding members 30 that now support the folding frame 12. The brackets 32 come in contact with the lugs 58 to stop the members 30 when the folding frame 12 has been moved forwardly a sufficient distance to have it about even with the rear end of the fixed frame 11. The winch 20 is then shut off and locked to maintain the cables 17-19 taut.

In preparation for unloading, usually straps that are used to secure a load to the frame are loosened, and then pins 55 and 56 are removed. The winch 20 is unlocked and the folding frame 12 is pulled rearwardly by hand to place the frame in an upright position as shown in FIG. 2. The pins 52 and 46 are replaced and the load is lowered toward the rear manually and by gravity while the winch 20 is operated to unwind the lengths of cable 17-19.

After unloading, the winch can be operated to pull the carrying frame 14 and the folding frame 12 to the positions as described above over the bed and cab of the pickup so that the bed can be used in a normal manner for hauling loads. While the loader is attached to the pickup truck, the pickup truck can be used readily for pulling a trailer or a recreational vehicle because the folding frame has been moved from the rear of the truck and stowed over the fixed frame 11. The entire loader can be readily removed from the pickup truck by disconnecting the folding frame from the fixed frame and then lifting upwardly on the fixed frame to remove the standards 26 from the stake-holders of the pickup truck.

I claim:

1. A loading and carrying device to be attached to a pickup truck comprising:

a fixed frame having a plurality of spaced standards to be attached to each side of a bed of the pickup truck, a fixed member attached to said standards along each side of said bed, said fixed members having respective rear portions terminating about even with the rear end of said bed and front portions extending from said bed forwardly substantially horizontally above the cab of said pickup truck, a rail fastened along the inside of each side of said fixed frame, each of said rails having a slanting portion extending upwardly and forwardly from the rear end of a floor of said bed, a gradually curved portion above a front portion of said bed and a horizontal portion extending forwardly above said cab, a carrying frame having for support a front and a rear cross member connected respectively across the front and the rear end thereof, the ends of said front cross member having movable supporting means constrained in adjacent ones of said rails and readily movable therealong, a pivotal supporting frame having on each side thereof an upright member connected to said fixed frame, said upright members during operation of said loading and carrying device being rigidly positioned vertically behind said bed of said pickup with respective lower ends positioned behind and below said bed of said puckup, a guiding member for each side of said pivotal supporting frame, each of said guiding members having a pivotal end pivotally connected to said lower end of said respective upright member, said guiding members being free to rotate about said respective pivotal ends in planes of the respective sides of said frames and having respective load-carrying ends opposite said pivotal ends, pivotal connecting means pivotally connecting each end of said rear cross member of said carrying frame to the adjacent one of said load-carrying ends of said guiding members, and hoisting means connected between said fixed frame and said guiding members, said hoisting means operable to rotate said guiding members about said pivotal ends for moving said rear cross member between a lower position near the ground and an upper position adjacent said rear ends of said fixed members while simultaneous moving said front cross member along said rails, thereby moving said carrying frame between a slanting position at the rear of said pickup truck and a substantially horizontal position over said cab and said bed.

2. A loading and carrying device as claimed in claim 1 wherein said pivotal connecting means includes a pair of suspending members, each of said suspending members having one end pivotally connected to said load-carrying end and its other end pivotally connected to the adjacent end of said rear cross member.

3. A loading and carrying device as claimed in claim 2 having a guiding and locking plate connected to each of said rear portions of said fixed members, a side of each of said guiding and locking plates being adjacent a side of a respective one of said upright members to restrain movement of said pivotal supporting frame in lateral directions, a supporting lug projecting from each of said upright members at a point near the connection thereof to a respective one of said fixed members, each of said lugs engaging a respective one of said guiding and locking plates to support said upright members while in a vertical position and being movable on said respective guiding and locking plate to permit rotation of said upright members from vertical to horizontal positions, first fastening means removably connected between each of said guiding and locking plates and a respective one of said upright members to retain said upright members vertically, second fastening means removable connected between said other end of each of said suspending members and said adjacent end of said rear cross member, fixed supporting means connected to said guiding and locking plates for engaging and supporting said rear cross member while said cross member is in said upper position, bearing means projecting rearwardly from said rear portion of said fixed member to contact the adjacent surface of said upright member, said upright members while vertical extending upwardly a substantial distance above said supporting means and said lugs, said hoisting means including cables connected forwardly from upper ends of said upright members, and while said first and second fastening means are removed to permit rotation of said upright members, said hoisting means being operable to rotate said upright members about said bearing means and to draw said upright members forwardly while restrained laterally by said guiding and locking plates to rest over respective ones of said fixed members.

4. A loading and carrying device as claimed in claim 3 having a sliding member connected to said rear portion of each of said fixed members, said sliding members being movable horizontally and longitudinally between respective forward positions in which said sliding members are supported over said fixed frame and respective rearward positions in which rear ends of said sliding members are positioned beyond the pickup truck to which said loading and carrying device is attached, fastening means connected between respective ones of said fixed members and said sliding members to retain said sliding members either in said rearward or in said forward positions as required, and said guiding and locking plates and said bearing means being connected to said rear ends of respective ones of said sliding members.

* * * * *